United States Patent [19]

Guyot

[11] Patent Number: 5,796,066
[45] Date of Patent: Aug. 18, 1998

[54] CABLE ACTUATED DRIVE ASSEMBLY FOR VACUUM CHAMBER

[75] Inventor: Francois L. Guyot, Milpitas, Calif.

[73] Assignee: Lam Research Corporation, Fremont, Calif.

[21] Appl. No.: 623,880

[22] Filed: Mar. 29, 1996

[51] Int. Cl.$^6$ .................................................. B23K 10/00
[52] U.S. Cl. ........................... 219/121.48; 219/121.43; 118/728; 114/939; 114/935
[58] Field of Search .................. 219/121.41, 121.43, 219/121.4; 156/643.1, 646.1, 345; 118/728, 729, 723 R; 414/935, 939

[56] References Cited

U.S. PATENT DOCUMENTS

| | | | |
|---|---|---|---|
| 4,340,462 | 7/1982 | Koch | 204/298.35 |
| 4,431,473 | 2/1984 | Okano et al. | 156/345 |
| 4,554,611 | 11/1985 | Lewin | 361/234 |
| 4,615,755 | 10/1986 | Tracy et al. | 156/345 |
| 4,790,258 | 12/1988 | Drage et al. | 118/500 |
| 4,842,683 | 6/1989 | Cheng et al. | 156/345 |
| 4,948,458 | 8/1990 | Ogle | 156/643.1 |
| 5,200,232 | 4/1993 | Tappan et al. | 427/569 |
| 5,215,619 | 6/1993 | Cheng et al. | 156/345 |
| 5,366,002 | 11/1994 | Tepman | 165/1 |
| 5,421,893 | 6/1995 | Perlov | 118/725 |
| 5,421,894 | 6/1995 | Lei et al. | 118/725 |
| 5,569,350 | 10/1996 | Osada et al. | 156/345 |

*Primary Examiner*—Mark H. Paschall
*Attorney, Agent, or Firm*—Burns, Doane, Swecker & Mathis, LLP

[57] ABSTRACT

In a vacuum processing chamber, a drive assembly for moving an article such as a substrate, clamp or pin lifter. The drive assembly includes at least one cable actuated assembly having a pin and housing mechanically coupled to a cable and sleeve, respectively, so that movement of the cable within the sleeve causes the pin to move within the housing. The other ends of the cable and sleeve are connected to a cable linkage box which is driven by an actuator to move the cable within the sleeve. A plurality of cable actuated assemblies can be attached to a substrate support at desired locations such that the pins extend through holes in the substrate support. The cables to which the pins are coupled can be simultaneously driven by the actuator to lift substrates off of the substrate support.

28 Claims, 7 Drawing Sheets

CABLE ACTUATED DRIVE ASSEMBLY FOR VACUUM CHAMBER

FIELD OF THE INVENTION

The present invention relates to a drive assembly for moving articles in a vacuum chamber and can be incorporated in a lift pin arrangement for lifting substrates such as semiconductor wafers or flat panel display substrates.

BACKGROUND OF THE INVENTION

Various types of equipment exist for semiconductor processing such as plasma etching, ion implantation, sputtering, rapid thermal processing (RTP), photolithography, chemical vapor deposition (CVD) and flat panel display fabrication processes wherein etching, resist stripping, passivation, deposition, and the like, are carried out. In such systems, it is necessary to transport and/or support the substrate by lift pin mechanisms. Such lift pin mechanisms can be used for temporarily supporting the substrates during transfer, thermal, chemical, optical and other treatments of the substrates.

Plasma generation is used in a variety of such semiconductor fabrication processes. Plasma generating equipment includes parallel plate reactors such as the type disclosed in commonly owned U.S. Pat. No. 4,340,462, electron cyclotron resonance (ECR) systems such as the type disclosed in commonly owned U.S. Pat. No. 5,200,232 and inductively coupled plasma systems such as the type disclosed in commonly owned U.S. Pat. No. 4,948,458. In such plasma processing systems, it is conventional to support the substrate to be treated on a substrate holder within a portion of a plasma process chamber. Further, it is conventional to hold the substrate on the substrate holder by mechanical and/or electrostatic clamping mechanisms. An example of a mechanical clamping system is disclosed in U.S. Pat. No. 4,615,755 and an example of an electrostatic chucking (ESC) arrangement is disclosed in U.S. Pat. No. 4,554,611.

Figure 1:
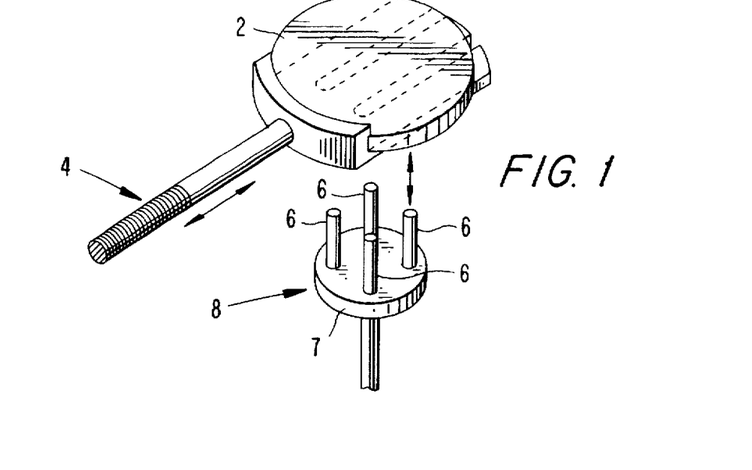
FIG. 1. shows a perspective view of a prior art lift pin arrangement.
Figure 2:
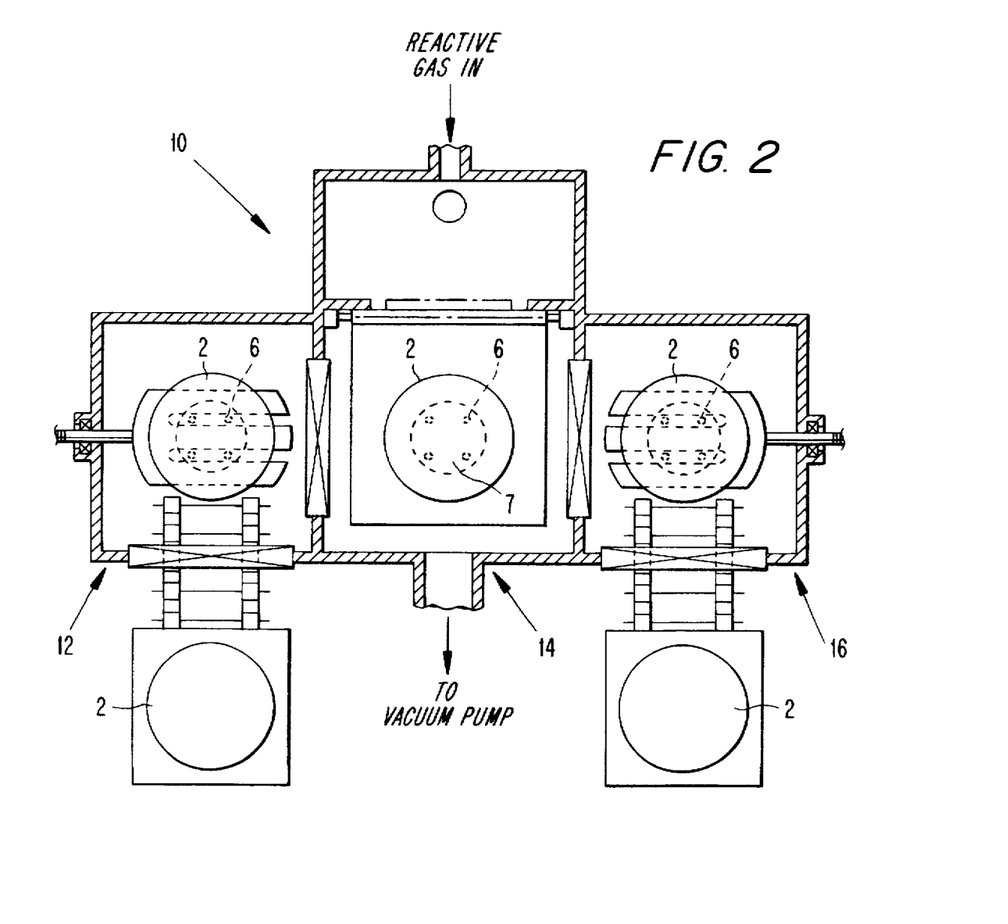
FIG. 2 Sows a cross section of a prior art semiconductor processing apparatus.

In order to transfer a substrate such as a wafer into a substrate processing chamber, it is conventional to utilize robot arm and lift pin arrangements such as the types disclosed in U.S. Pat. Nos. 4,431,473, 4,790,258, 4,842,683 and 5,215,619. In order to lower the wafer onto a substrate holder, it is conventional to use a lift pin arrangement such as the type disclosed in U.S. Pat. No. 4,431,473 wherein four lift pins are arranged in a circular pattern which is concentric with a substrate in the form of a wafer. As shown in FIG. 1, a wafer 2 is supported on a robotic arm 4 and a lift pin mechanism 8 having four lift pins 6 projecting from a lifter 7 (also referred to as a "puck" or "yoke"), is below the wafer 2. As shown in FIG. 2, the lift pin mechanism can be utilized in a semiconductor processing apparatus 10 having an entrance load lock 12, a substrate processing chamber 14 and an exit load lock 16.

The lift pins are supported on a lifter 7 forming part of a substrate holder of a substrate processing apparatus wherein the lifter 7 is movable in a vertical direction between upper and lower positions. The lifter is movable such that the lift pins have an upper surface located above a substrate support surface of the substrate holder when the lifter is in the upper position and the upper surface of the lift pin is below the substrate support surface when the lifter is in the lower position. Thus, part of the lift pin passes through a lift pin hole in the substrate holder when the lifter moves from the lower position to the upper position.

Figure 3:
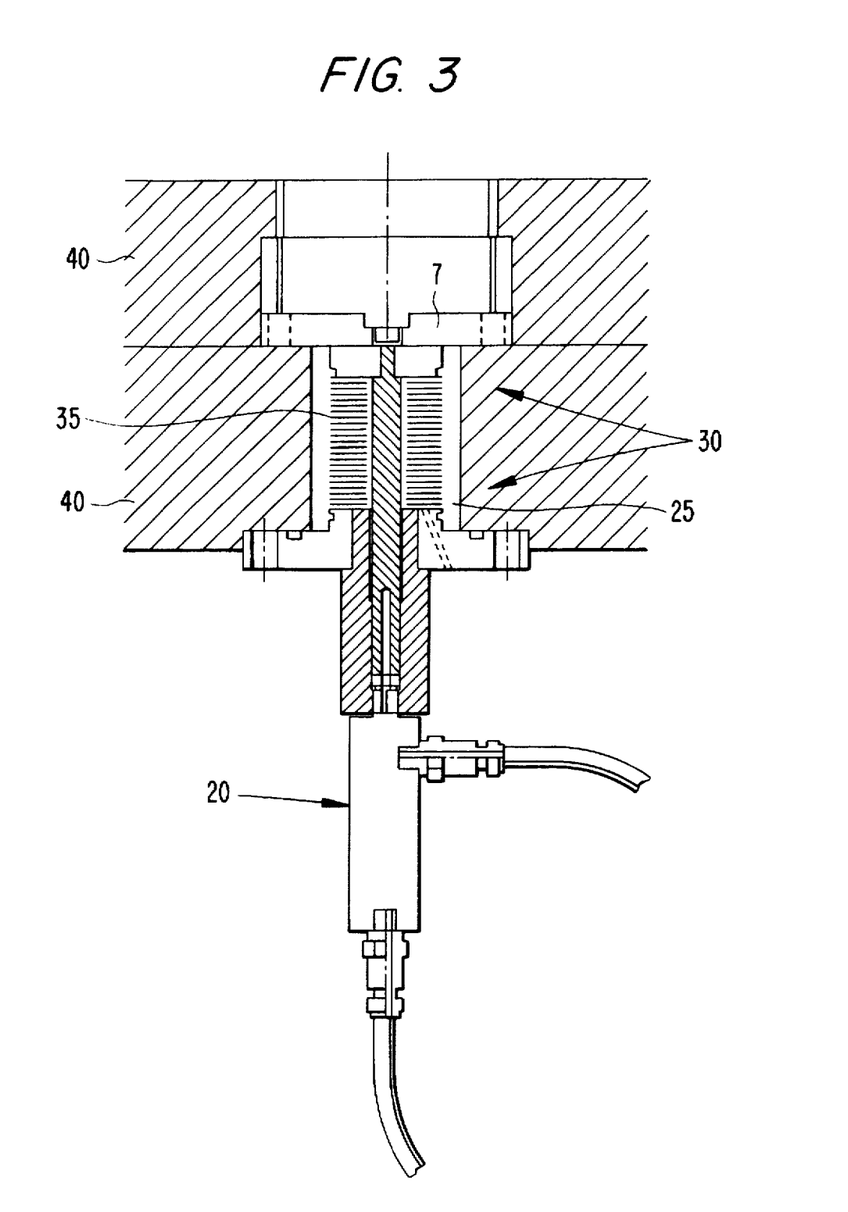
FIG. 3 shows a cross section of a prior art pin lifter/bellows weldment/cylinder assembly.

To drive the lifter 7, a cylinder 20, such as a conventional pneumatic cylinder, and a bellows weldment 30 are generally used as shown in FIG. 3. The cylinder 20 drives the bellows weldment 30 which extends and contracts upon each cylinder stroke. The bellows weldment 30 includes a housing 25 with a bellows 35 disposed in the housing to seal the vacuum in the vacuum chamber from atmospheric pressure. The bellows weldment 30 is disposed within an opening in the electrode cap 40.

Although the direct drive approach of prior art pin lifters is desirable for its simplicity, prior art pin lifters suffered from a number of disadvantages. First, as the articles being processed in the vacuum processing chamber have increased in size in the industry (e.g., wafers of 300 mm diameter), the stability of the article supported by the pins is reduced. Previous designs do not accommodate a pin distribution proportional to the larger wafer size common today. The smaller the lifter, the more unstable the wafer, especially if residual electrostatic charges are present.

Spreading apart the pins for stability, however, requires that a proportionately larger cavity be provided in the electrode housing for the lifter assembly, which imposes significant design restraints. To provide stability for large wafers, the 4-pin lifter approach requires a large cavity beneath the electrode cap to accommodate the lifter assembly. In addition to imposing restraints on the design of the electrode cap, the enlarged cavity also adversely affects the temperature uniformity of the electrode cap. The puck occupies valuable space within the electrode cap, gets in the way of other components and prevents optimal heat transfer.

Furthermore, the piston of the pneumatic cylinder in prior art designs tended to stick after a long period of inaction (e.g., 24 hours), causing the wafer to jump. This phenomenon was exacerbated by the proximity of the cylinder to the electrode cap 40 in which temperatures fluctuate from freezing to boiling.

Another problem in prior designs arises from the need to use a limit switch which is RF-proof so as not to interfere with the RF fields generated in the electrode 40. The limit switch is used to sense the position of the pins, and in prior designs comprised an expensive RF-proof fiber optics assembly.

Finally, due to integral nature of the cylinder 20 within the electrode cap assembly 40, a costly system tear down was necessary whenever servicing of the cylinder 20 was required.

Although other designs for the pin lifter have been proposed, these too suffer disadvantages. For example, a hydraulic cylinder can be used to activate the pins; however the presence of a hydraulic apparatus integrated in the electrode housing of the vacuum chamber raises concerns of leakage and contamination. A lead screw array, in which screws are rotated simultaneously, can also be used to raise and lower the pins. However, this approach is complex, unreliable, and expensive due to too many moving parts to adjust.

SUMMARY OF THE INVENTION

The invention provides a drive assembly for moving an article in a vacuum chamber, the drive assembly comprising a pin, a housing, a cable, a sleeve and an actuator. The pin is engageable with the article so as to move the article in the vacuum chamber and the pin is slidably supported within the housing. The cable is slidable within the sleeve, the cable having an end mechanically coupled to the pin and the sleeve having an end mechanically coupled to the housing. The actuator is engaged with the cable so as to move the cable with respect to the sleeve and move the pin with respect to the housing.

According to various embodiments of the invention, an adapter rod can be connected to the pin and the cable. The adapter rod can be slidably supported in the housing and include a recess therein wherein one end of the pin is held by a friction fit. The housing can include a bellows having a first end and a second end, the first end of the bellows being mechanically coupled to the adapter rod, and the second end of the bellows being mechanically coupled to the housing. The actuator can comprise a pneumatic cylinder. A mechanical position sensor can be provided to detect a position of the pin with respect to the housing, the sensor being located at a location remote from the housing. The housing can comprise a cylinder having a bushing slidably mounted therein, the bushing being connected between the pin and the cable such that movement of the cable drives the pin into and out of the housing. The pin can consist essentially of a dielectric ceramic material and the sleeve and the cable can consist essentially of dielectric polymer materials. The article can comprise a clamp, a substrate, lift pin assembly or temperature probe and the actuator can be located outside the vacuum chamber.

The invention also provides a method of moving an article in a vacuum chamber including a drive assembly comprising a pin, a housing, a cable, a sleeve and an actuator, the pin being slidably mounted within the housing and engageable with the article, the cable being coupled to the pin and the actuator, and the sleeve being coupled to the housing. The method includes moving the article within the vacuum chamber by activating the actuator, the actuator causing the cable to slide within the sleeve and the pin to slide within the housing such that the pin moves the article. The article can comprise a substrate on a substrate support, the pin extending through a hole in the substrate support and a free end of the pin being engageable with a lower surface of the substrate, the method including moving the free end of the pin into engagement with the substrate while maintaining a vacuum seal between the housing and the substrate support. The cable can be moved by applying a pressurized gas to the actuator. A position of the cable with respect to the sleeve can be detected by a sensor supported by the actuator. The actuator can be located outside of the vacuum chamber and the cable can include one end thereof attached to the actuator, the article being moved by pushing and pulling the cable with the actuator.

The invention also provides a lift pin assembly for lifting a substrate in a vacuum chamber, the lift pin assembly comprising a plurality of cable actuated assemblies, each of the cable actuated assemblies including a pin, a housing, a cable, and a sleeve, the pin being engageable with the substrate so as to lift the substrate in the vacuum chamber, the pin being slidably supported within the housing, the cable being slidable within the sleeve, the cable having a first end mechanically coupled to the pin and the sleeve having a first end mechanically coupled to the housing; and an actuator engaged with each cable so as to simultaneously move the pin of each of the cable actuated assemblies and lift or lower the substrate. Each of the cable actuated assemblies can further comprise an adapter rod connected to the pin and the cable, adapter rod being slidably supported in the housing, the adapter rod including a recess therein and one end of the pin being held by a friction fit within the recess. Each of the cable actuated assemblies can be attached to a substrate support within the vacuum chamber and the actuator can be located outside the vacuum chamber. The vacuum chamber can comprise a plasma chamber and the cable actuated assemblies can be attached to a substrate support having holes extending therethrough, the pin of each of the cable actuated assemblies being located in a respective one of the holes with a clearance therebetween, the clearance being small enough to minimize arcing during processing of a substrate clamped to the substrate support. The substrate support can include an electrode which provides an RF bias to a substrate supported on the substrate during processing of the substrate, the pin of each of the cable actuated assemblies extending through a hole in an annular zone of the electrode adjacent an outer periphery thereof.

BRIEF DESCRIPTION OF THE DRAWINGS

The foregoing and other objects, features and advantages of the present invention will be more readily understood upon reading the following detailed description in conjunction with the drawings in which.

DETAILED DESCRIPTION OF THE PREFERRED EMBODIMENTS

The invention provides a drive assembly for moving an article within a vacuum chamber. The drive assembly includes at least one cable actuated assembly having a pin slidably mounted in a housing and a sleeve containing a cable which moves the pin within the housing. The cable is driven by an actuator which can be located outside the vacuum chamber. A plurality of such pin assemblies can be used to lift a substrate off of a substrate holder, according to a first embodiment of the invention.

Figure 4:
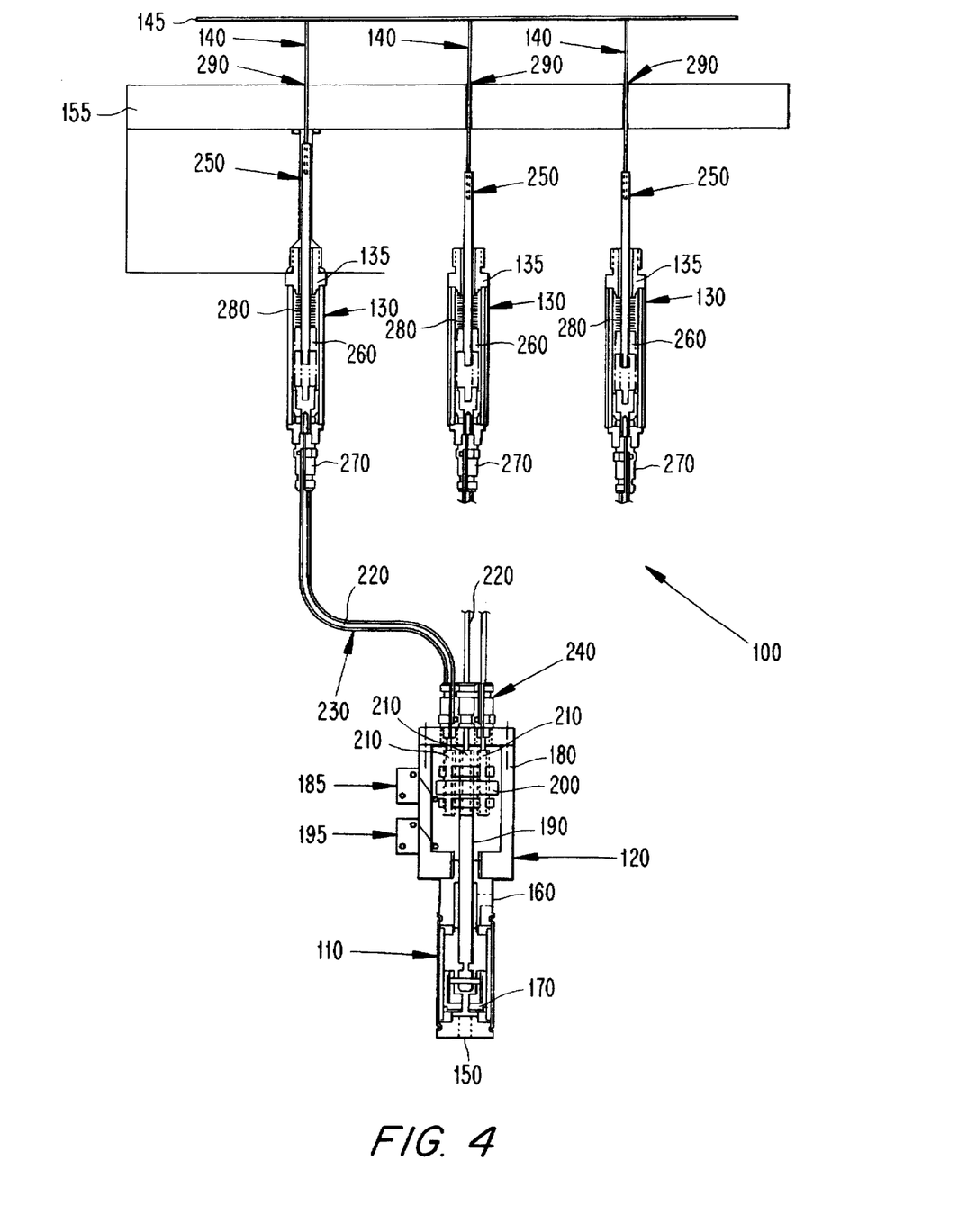
FIG. 4 shows a pin lifter assembly according to an exemplary embodiment of the invention.
Figure 5:
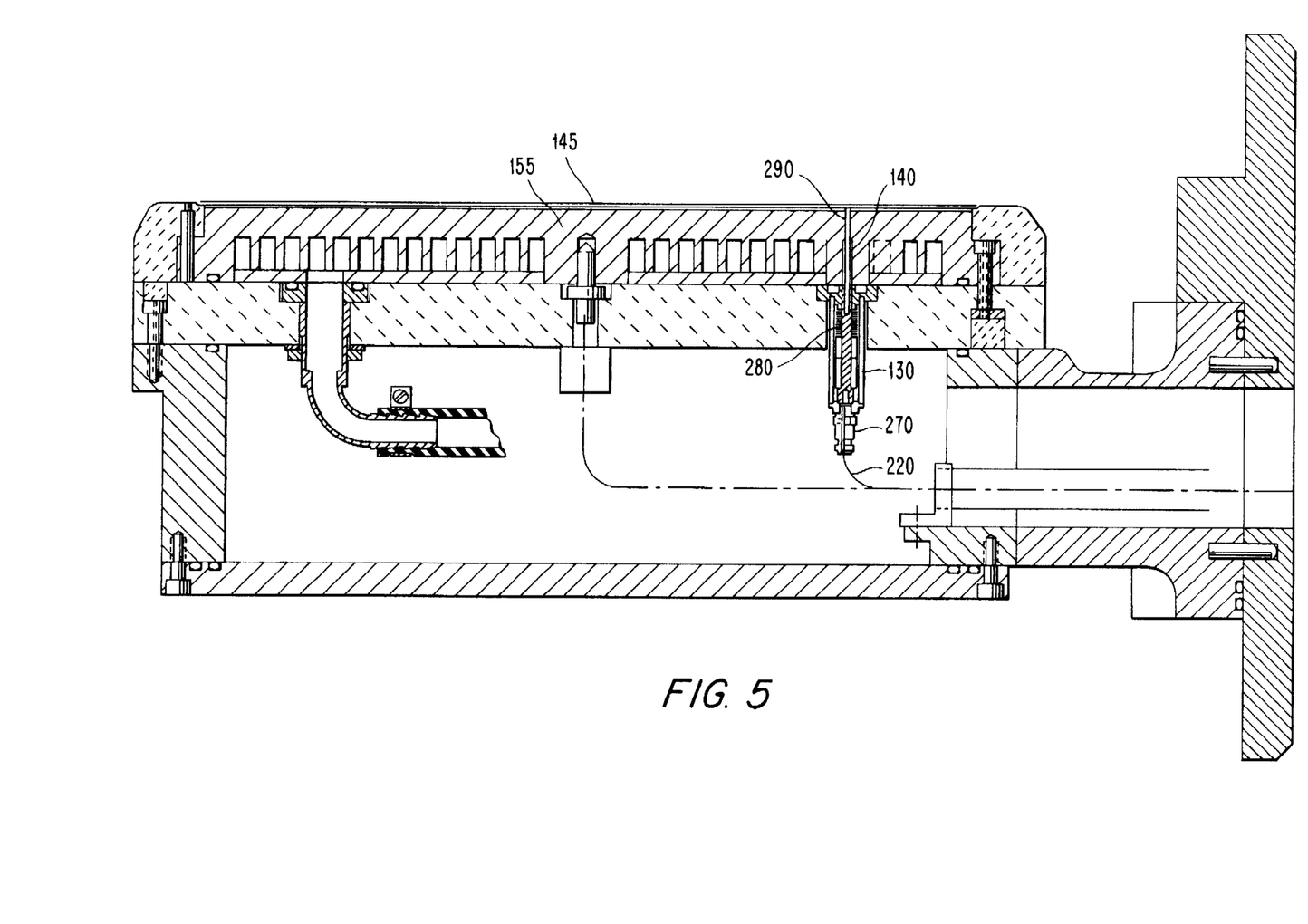
FIG. 5 shows a pin lifter assembly according to an exemplary embodiment of the invention which is integrated with a chuck.

FIG. 4 shows a diagram of a drive assembly 100 according to the first embodiment of the present invention. The assembly 100 of FIG. 4 includes an actuator 110 and a cable linkage box 120 linked with cable and sleeve assemblies 220/230 to a plurality of housings 130 and a plurality of pins 140. In FIG. 4, the pins 140 are shown supporting a substrate 145 such as a semiconductor wafer. During processing of a substrate 145 in the substrate processing chamber, the substrate 145 can be clamped on a substrate support 155 by any suitable restraining apparatus. For instance, the substrate holder 155 can incorporate an electrostatic chucking (ESC) arrangement for clamping the substrate to the substrate holder 155, as shown in FIG. 5. Alternatively, a mechanical clamping arrangement (not shown) can be provided for holding the substrate 145 to the substrate holder 155. For instance, if the substrate 145 comprises a semiconductor wafer, a clamping ring can be used to clamp the wafer to the substrate holder 155. The pins 140 can be located at any desired positions such as in an annular zone adjacent an outer periphery of the substrate support.

An ultra-low friction pneumatic cylinder, such as the AIRPEL cylinder manufactured by Airpot Corp., can be used as the actuator 110 to substantially eliminate friction. The pneumatic cylinder 110 may include a port 150 for receiving air from a compressor to force the piston 170 of the pneumatic cylinder 110 into an up position as well as a port 160 for receiving air from the compressor to force the piston 170 into a down position. The piston 170 of the cylinder 110 is mechanically coupled to the cable linkage box 120 which simultaneously activates the pins 140. Although the ultra-low friction pneumatic cylinder is the preferred apparatus for the actuator 110, those skilled in the art will readily appreciate that other types of actuators can be used in conjunction with the present invention.

Above the actuator 110, FIG. 4 shows the cable linkage box 120 which is mechanically coupled to the actuator 110. The cable linkage box 120 includes a housing 180 and a central piston 190 which slides axially within the housing 180 to activate the individual pins 140. Projecting radially from the central piston 190 is an annular flange 200 on which is fixed a connector 210 for each pin. The connectors 210, three of which are shown in FIG. 4, are secured to the annular flange 200 in any suitable manner so that they move in unison when the central piston 190 of the cable linkage box 120 is activated. For example, each connector 210 can have a threaded hole which receives a screw fixed to the annular flange 200. The cable linkage box 120 can be provided with inexpensive mechanical switches 185 and 195, for sensing an indicator inside the housing 180 which indicates whether the central piston 190 is in an up position or a down position. The cable linkage box 120 can include a mechanism for adjusting the slack and tension on each cable to provide synchronous motion of the individual pins. For example, each cable 220 can be adjustably fixed to its respective connector 210 with a threaded fitting. The cable 220 is fixed to one end of the threaded fitting, for example, by crimping. The other end of the threaded fitting is threaded into a threaded hole of the connector 210. By rotating the threaded fitting within the connector 210, the position of the cable 220 with respect to the connector 210 and flange 200 can be adjusted. In this way, the position of each cable 220 can be precisely adjusted so that the top of the pins 140 are in their desired locations.

Each cable 220 is disposed within a sleeve 230. The sleeve 230 which surrounds each cable 220 is coupled to the housing 180 of the cable linkage box 120, for example with a fitting 240. The fitting 240 may be a quick release tube fitting. Thus, the cable linkage box 120, which is activated by the actuator 110, causes each cable 220 to move within its associated sleeve 230 in unison as the central piston 190 moves within the housing 180 of the cable linkage box 120 because the cables 220 are coupled to the central piston 120 and the sleeves 230 are coupled to the housing 180. The push/pull cable and sleeve assembly thus operates much like a gear shifter on a bicycle. According to a preferred embodiment, the cable 220 is formed of a dielectric polymer material such as polyether-ether-ketone (PEEK) or a nylon/fiberglass material, and the sleeve is formed of a dielectric polymer material such as polytetraethylene (PTFE) or Teflon, which forms a low friction push-pull linkage. These materials are also sufficiently strong to withstand a high number of cycles, (e.g., 500,000), even with a 1-inch bend radius loop in the middle of the cable and sleeve assembly.

The end of each cable 220 opposite the cable linkage box 120 is mechanically coupled to an associated pin 140. This may be accomplished with an adapter shaft 250 connected between the pin 140 and the cable 220. The pin/adapter shaft assembly slides within a housing 130 provided for each pin 140. The housing 130 may comprise an outer wall in the shape of a cylinder made of pyrex glass, for example, or any other suitable material such as a fired, polished glass. The sleeve 230 may be mechanically coupled to the housing 130 with a conventional fitting 270, as shown in FIG. 4, so that when the cable 220 is caused to move within the sleeve 230, the pin 140 moves within the housing 130. Thus, through mechanical coupling, the remote actuator 110 causes the pins 140 within the vacuum chamber to move in unison.

Each pin 140 is preferably fixed inside a recess in its respective adapter shaft 250. For instance, the pins 140 can be held by a friction fit within the recess (e.g., the diameter of the recess of the adapter shaft 250 can be sufficiently small to grip the pins 140 and hold them in place by friction). This configuration provides the additional benefit that the relative heights of the pins 140 can be easily adjusted by inserting each pin 140 to the desired depth. For example, if one of the pins 140 is higher than desired, it can be inserted farther into the adapter shaft 250 to arrive at the desired height. For adjustment of the pin heights it is sufficient to simply press the pins into the substrate support 155 such that the exposed ends of the pins are flush with or slightly below the surface of the substrate support on which a substrate is supported.

To prevent loss of vacuum pressure and/or leakage of gas or contaminants into the vacuum chamber, a small bellows 280 may be provided within the housing 130 to seal each individual pin 140. The bellows 280, which may be formed of metal or any other suitable material, is sealed at one end around the adapter shaft 250 and at its other end to a cap 135 on the housing 130. The bellows 280 seals the vacuum chamber from outside air while allowing the adapter shaft 250 and pin 140 to slide freely up and down within the vacuum chamber. The bellows 280 expands and contracts inside the housing 130. In this configuration, the bellows 280 has a vacuum on its inside, which is beneficial for its design life. A bushing 260, which may be a high precision graphite bushing, is attached to the bellows 280. The bushing 260 allows the bellows 280 to ride smoothly in a decelerated up and down motion. FIG. 4 shows the bellows 280 in a retracted state in which the pins 140 are in the upward position. As the pins 140 descend into their respective housings 130, the bellows 280 is expanded downward to maintain the vacuum seal.

During some substrate processing procedures, it is conventional to enhance heat transfer between the back or reverse side of the substrate 145 and the substrate holder by providing pressurized helium gas between the underside of the substrate 145 and the substrate holder 155. The holes 290 through which the lift pins 140 travel to lift the substrate 145 above the substrate holder 155 could serve an additional function of allowing helium gas to pass through the substrate holder 155 into contact with the underside of the substrate 145. For instance, when the lifter assembly is in the bottom position, the lift pins 140 can remain at least partially in the holes 290 in the substrate holder 155 and the clearance between the lift pins 140 and the holes 290 can be maintained such that helium can be supplied to the backside of the substrate 145. Alternatively, the heat transfer gas can be supplied to the underside of the substrate by gas passages other than the holes 290. For instance, helium could be supplied to a channel in the substrate holder 155 at a location adjacent an outer periphery of the substrate.

According to a preferred embodiment of the invention, the lift pins 140 can readily be replaced and can be of various materials such as ceramic material (e.g., sapphire, alumina, quartz, etc.) or metal (e.g., stainless steel or Nitinol, a NiTi alloy having 53–57 wt % Ni with or without additional alloying elements). Ceramic materials are desirable due to their compatibility in a vacuum chamber environment. Nitinol materials are useful in that they may exhibit the "superelastic effect" where, if subjected to a mechanical strain sufficient to cause substantial bending (e.g., over 3% strain), the material returns immediately to its original shape as soon as the force causing the strain is removed. Thus, in a lift pin arrangement, thin wires of a superelastic alloy can be used to provide a lift pin arrangement which will accommodate dramatic bends of the lift pins without permanent distortion thereof. Further, if the lift pins become deformed, the heat recoverable property of the alloy can be used to recover the original shape of the lift pins. Other details of the use of lift pins comprising a shape memory alloy can be found in commonly owned U.S. application No. 08/577,520, which is hereby incorporated by reference.

According to a preferred embodiment of the invention, pins 140 are of a dielectric ceramic material such as high purity alumina (e.g., 99.5% or higher purity). Such dielectric materials are not electrically conductive, thus avoiding voltage potential problems associated with conventional stainless steel lift pins. Further, the lower thermal expansion coefficients of ceramic materials provide advantages over metal lift pins with respect to maintaining desired tolerances when subjected to temperature cycles during processing of a substrate.

The pins 140 can be chamfered at each end, have a length of 1 to 2 inches (e.g., 1¼) and a diameter of about 0.05 to 0.20 inches (e.g., 0.125 inch). In the case of 0.125 inch diameter pins, the lift pin holes 290 can have a diameter of about 0.136 inch, thus providing a radial clearance of about 5 mils. The pins can include a smaller diameter portion thereof fitted in the recess in the adapter shaft 250. The adapter shaft 250 can include one or more axially extending slits to allow slight expansion of the recess to provide a press fit with the reduced diameter portion of the pin. Further, the outer diameter of the adapter shaft can be sized to match that of the pin and avoid the presence of gaps in the lift pin hole 290 which can lead to electrical arcing.

It will be appreciated that the design of exemplary embodiments of the present invention overcomes many of the problems in the prior art. For example, as shown in FIG. 4, because the actuator 110 has been relocated to a position which is remote from the substrate support 155, the problems arising from the extreme variations in temperature of the electrode such as sticking of the lift pins can be substantially eliminated. The simultaneous action of the push-pull cables 220 is also inherently smooth. Further, because the pins can be located between cooling channels in the electrode and there is no need to provide a large cavity as in conventional lift pin arrangements, better thermal distribution over the substrate support can be achieved. The invention also obviates the need for using an expensive fiber optic RF-proof limit switch for detecting the position of the pin 140, since the limit switch used may be of any conventional design without concern for the disruption of the RF fields of the electrode 155. For example, inexpensive mechanical switches may be used since the switches can be located on the actuator outside the vacuum chamber.

If servicing or adjustment of the actuator 110 is required, a costly system tear down is not required, since the actuator 110 is remote from the electrode 155 and may be easily accessed. Due to the remote location of the actuator 110, other forms of actuators, e.g., motors, may be easily substituted for the purpose of studying variational positioning effects of other devices, for example RF biasing dielectric shifts that affect process shift. Also, by separating the pins 140 from each other by distances greater than in conventional lift pin arrangements wherein the lift pins are mounted on a common plate or yoke lifter, stability of the wafer 145 or substrate such as a flat panel display substrate is improved with the result that the positioning of the substrate is improved. Compared to conventional arrangements wherein four closely positioned lift pins are needed to provide stability to the substrate, three lift pins according to the invention can be more widely spaced apart in a triangular pattern. Since a larger tripod distributes the substrate load more efficiently, the present design can more efficiently push the wafer up even when asymmetric residual electrostatic charges are present. The increased stability is achieved without the need to provide a large cavity within the electrode 155 to accommodate a conventional lifter plate or yoke. The design thus frees up room underneath the electrode 155 for other devices or functions, such as RF decoupling capacitors. The improved utilization of space provides accessibility to internal electrode components, which facilitates assembly. Overall reliability of the electrode is improved since there are fewer moving parts (e.g., there is no longer a yoke or puck which may interfere with the cooling system and which may tear electrical wiring.)

The drive assembly of the present invention is versatile enough to be installed in a wide variety of machines and platforms. It is a simple and inexpensive arrangement for a multitude of applications in a vacuum chamber environment. The drive assembly can be used in applications requiring movement of articles, such as substrates, clamps, sensors, etc. For instance, the drive assembly can be used where the pin moves a temperature probe into contact with the back side of the wafer while it is being clamped. Further, the invention allows simultaneous multiprobe actuation thus creating additional possibilities for temperature measurement techniques.

Figure 6:
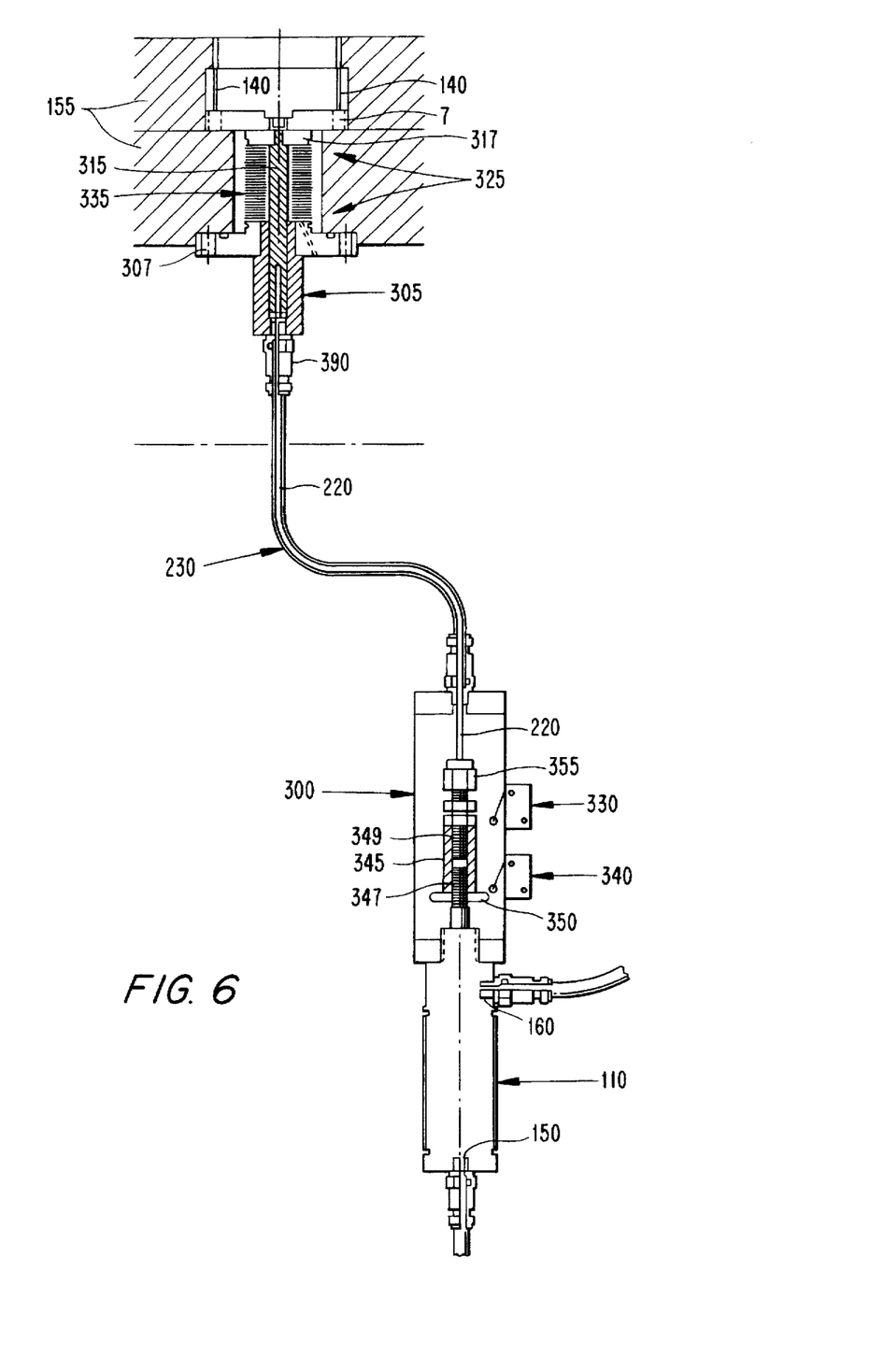
FIG. 6 shows a 4-pin lifter retrofitted with a cable and sleeve assembly according to an exemplary embodiment of the invention.

According to a second embodiment of the invention, the drive assembly shown in FIGS. 4 and 5 can also be utilized to drive a conventional 4-pin lifter. As shown in FIG. 6, the conventional 4-pin puck 7 can be retrofit with a cable 220 and sleeve 230 which are connected to a remote linkage bracket 300 and actuator 110. As in the previous embodiment, the actuator 110 is preferably a low-friction pneumatic cylinder having ports 150 and 160 for receiving air from a compressor to force the piston in an upward and downward direction, respectively. A bellows weldment 325, a bellows bushing 305, a bellows rod 315, and a bellows 335 are provided to couple the motion of the cable 220 to the 4-pin puck 7 and to maintain a vacuum seal in the vacuum chamber.

Figure 7A:
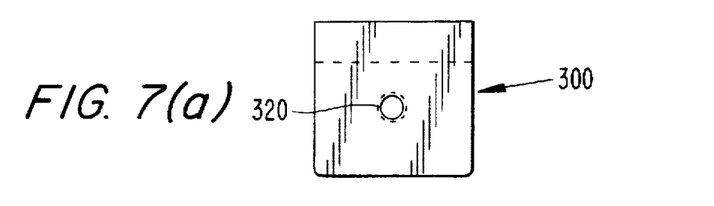
FIGS. 7a, 7b, and 7c show top, side, and bottom views of the linkage bracket of FIG. 5.
Figure 7B:
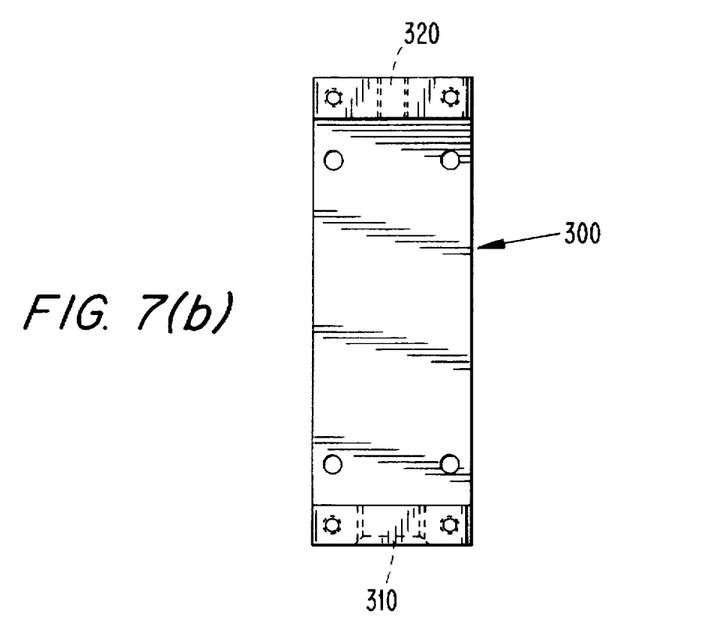
Figure 7C:
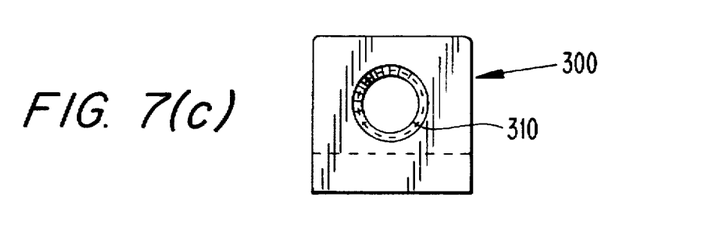

FIG. 6 shows a modified linkage assembly 300 which mechanically couples the movement of the cylinder piston to the single cable 220. FIGS. 7(a), 7(b), and 7(c) show top, side, and bottom views, respectively of the housing of the linkage assembly 300 of FIG. 6. As shown in FIGS. 7(b) and 7(c), the linkage assembly 300 may have a generally square cross section with a cylindrical opening 310 on one side which accepts a suitable connector from the piston of the actuator 110. The top of the linkage assembly 300, as shown in FIG. 7(a), includes a circular recess 320 which accepts a fitting of the cable and sleeve assembly. The linkage assembly 300 also may include an up-position switch 330 and a down-position switch 340, as shown in FIG. 6, which sense the position of a position indicator 350 disposed within the linkage assembly 300. As discussed above, these switches 330 and 340 may be inexpensive mechanical switches for limit sensing, as it is not necessary to use a fiber optics RF-proof switch due to the remote location of the actuator 110 and linkage assembly 300.

As in the embodiment shown in FIG. 4, the linkage box 300 may include a mechanism for adjusting the slack and/or tension of the cable 220. For example, the linkage box 300 may include a standoff 345 which has a threaded hole along its axis for receiving a threaded member 347 coupled to the actuator 110 and a threaded member 349 coupled to the cable 220 with a fitting 355. The fitting 355 is fixed at one end, such as by crimping, to the cable 220. The other end of the fitting 355 is the threaded member 349 which screws into the standoff 345. Thus, by rotating the threaded member 349 of the fitting 355 within the standoff 345, the slack and/or tension of the cable 220 with respect to the actuator 110 can be adjusted.

Figure 8A:
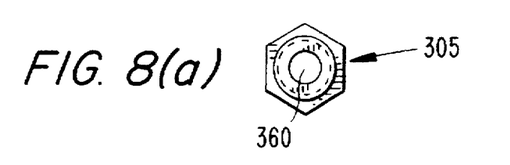
FIGS. 8a, 8b, and 8c show top, side, and bottom views of the bellows bushing of FIG. 5.
Figure 8B:
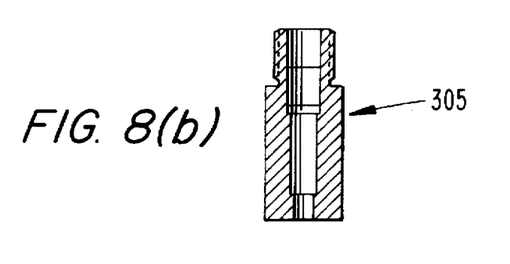
Figure 8C:
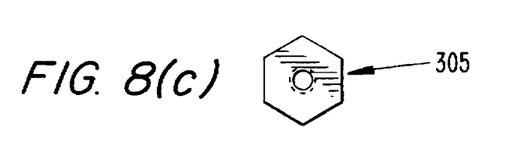
Figure 9A:
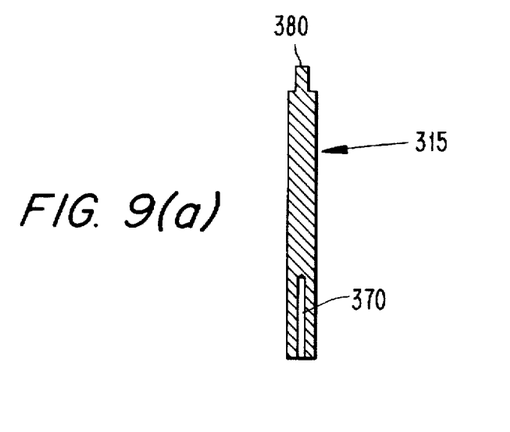
FIG. 9 shows side and bottom views of the bushing rod of FIG. 5.
Figure 9B:
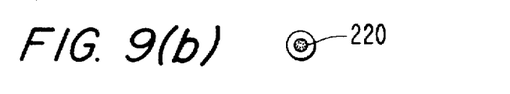

FIGS. 8(a), 8(b), and 8(c) show a top, side, and bottom view of the exemplary bellows bushing 305 of FIG. 6. The bellows bushing 305 may have a hexagonal outer surface, within which is provided a cylindrical bore 360 which receives the bellows rod 315. Side and bottom views of the bellows rod 315 of FIG. 6 are shown in FIG. 9. At one end, the bellows rod 315 preferably has a recess 370 into which the end of the cable 220 is received and fixed. At the other end of the bellows rod 315, a projection 380 is formed which links the bellows rod to the pin lifter puck 7 which houses the pins 140. The sleeve 230 is connected through a suitable fitting 390 to the bellows bushing 305 so that when the cable 220 moves within the sleeve 230, the bellows rod 315 moves within the bellows bushing 305 to raise and lower the pin lifter puck 7.

As shown in FIG. 6, the bellows 335 of the bellows weldment 325 is sealed at its lower end to the bellows bushing 305 and a plate 307 and at its upper end to the top of the bellows rod 315 through a cap 317. According to this embodiment, the inside of the bellows 335 is at atmospheric pressure, and outside the bellows 335 is the vacuum of the vacuum processing chamber. When the pins 140 are lifted, the bellows 335 expands in length because its upper end rises with the 4-pin puck 7, and its lower end remains fixed to the plate 307. The bellows 335 thus allows the bellows rod 315 to move up and down within the electrode cap 155 while preventing the air inside the bellows 335 from reaching the vacuum chamber.

It will be appreciated that many of the advantages of the embodiment shown in FIG. 4 can also be realized with the conventional 4-pin puck shown in FIG. 6. For example, the actuator 110 is not subject to the widely varying temperatures of the electrode 155, with the result that the piston is much less likely to stick. Furthermore, the actuator 110 may be repaired or replaced easily without tearing down the system. Also, the new design allows inexpensive mechanical switches 330 and 340, rather then RF-proof fiber optics, to be used as limit switches to detect the position of the pins 140.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A drive assembly for moving an article in a vacuum chamber, the drive assembly comprising:

a pin engageable with the article so as to move the article in the vacuum chamber, the pin being slidably supported within a housing;

a flexible cable and sleeve assembly comprising a cable slidable within a sleeve surrounding the cable, the cable having an end mechanically coupled to the pin and the sleeve having an end mechanically coupled to the housing; and an actuator engaged with the cable so as to move the cable with respect to the sleeve and move the pin with respect to the housing.

2. The assembly of claim 1, further comprising an adapter rod connected to the pin and the cable, the adapter rod being slidably supported in the housing, the adapter rod including a recess therein and one end of the pin being held by a friction fit within the recess.

3. The assembly of claim 1, further comprising an adapter rod and bellows, the adapter rod being slidably mounted within the housing and connected to the pin, the bellows having a first end and a second end, the first end of the bellows being mechanically coupled to the adapter rod, and the second end of the bellows being mechanically coupled to the housing.

4. The assembly of claim 1, wherein the actuator comprises a pneumatic cylinder.

5. The assembly of claim 1, further comprising a mechanical position sensor which senses a position of the pin with respect to the housing, the sensor being located at a location remote from the housing.

6. The assembly of claim 1, wherein the pin consists essentially of a dielectric ceramic material.

7. The assembly of claim 1, wherein the housing comprises a cylinder having a bushing slidably mounted therein, the bushing being connected between the pin and the cable such that movement of the cable drives the pin into and out of the housing.

8. The assembly of claim 1, wherein the sleeve and the cable consist essentially of dielectric materials.

9. The assembly of claim 1, wherein the article comprises a substrate and the housing is attached to a substrate support which supports the substrate when the pin is in a retracted position, the actuator being remote from the substrate support.

10. The assembly of claim 1, wherein the article comprises a substrate and the housing is attached to a substrate support which supports the substrate when the pin is in a retracted position, the actuator being immovably fixed in position with respect to the vacuum chamber.

11. The assembly of claim 1, wherein the actuator includes means for adjusting slack and tension on the cable.

12. A drive assembly for moving an article in a vacuum chambers, the drive assembly comprising:

a pin engageable with the article so as to move the article in the vacuum chamber, the pin being slidably supported within a housing;

a cable and sleeve assembly comprising a cable slidable within a sleeve surrounding the cable, the cable having an end mechanically coupled to the pin and the sleeve having an end mechanically coupled to the housing; and an actuator engaged with the cable so as to move the cable with respect to the sleeve and move the pin with respect to the housing, the article comprising a clamp, a substrate, lift pin assembly or temperature probe and the actuator being located outside the vacuum chamber.

13. A method of moving an article in a vacuum chamber including a drive assembly comprising a pin, a housing, a flexible cable, a sleeve and an actuator, the pin being slidably mounted within the housing and engageable with the article, the cable being coupled to the pin and the actuator, and the sleeve being coupled to the housing, the method comprising:

moving the article within the vacuum chamber by activating the actuator, the actuator causing the cable to slide within the sleeve and the pin to slide within the housing such that the pin moves the article.

14. The method of claim 13, wherein the article comprises a substrate on a substrate support, the pin extending through a hole in the substrate support and a free end of the pin being engageable with a lower surface of the substrate, the method including moving the free end of the pin into engagement with the substrate while maintaining a vacuum seal between the housing and the substrate support.

15. The method of claim 13, wherein the cable is moved by applying a pressurized gas to the actuator.

16. The method of claim 13, further comprising detecting a position of the cable with respect to the sleeve, the detecting being carried out by a sensor supported by the actuator.

17. The method of claim 13, wherein the article comprises a substrate and the housing is attached to a substrate support which supports the substrate when the pin is in a retracted position, the actuator being remote from the substrate support, the substrate being moved by sliding the cable within the sleeve while maintaining the actuator fixed in position with respect to the vacuum chamber.

18. The method of claim 13, wherein the actuator includes means for adjusting slack and tension on the cable.

19. A method of moving an article in a vacuum chamber including a drive assembly comprising a pin, a housing, a cable, a sleeve and an actuator, the pin being slidably mounted within the housing and engageable with the article, the cable being coupled to the pin and the actuator, and the sleeve being coupled to the housing, the method comprising:

moving the article within the vacuum chamber by activating the actuator, the actuator causing the cable to slide within the sleeve and the pin to slide within the housing such that the pin moves the article, the actuator being located outside of the vacuum chamber and the cable including one end thereof attached to the actuator, the article being moved by pushing and pulling the cable with the actuator.

20. A lift pin assembly for lifting a substrate in a vacuum chamber, the lift pin assembly comprising:

a plurality of flexible cable actuated assemblies, each of the cable actuated assemblies including a pin, a housing, a cable, and a sleeve, the pin being engageable with the substrate so as to lift the substrate in the vacuum chamber, the pin being slidably supported within the housing, the cable being slidable within the sleeve, the cable having a first end mechanically coupled to the pin and the sleeve having a first end mechanically coupled to the housing; and an actuator engaged with each cable so as to simultaneously move the pin of each of the cable actuated assemblies and lift or lower the substrate.

21. The assembly of claim 20, wherein each of the cable actuated assemblies further comprises an adapter rod connected to the pin and the cable, the adapter rod being slidably supported in the housing, the adapter rod including a recess therein and one end of the pin being held by a friction fit within the recess.

22. The assembly of claim 20, wherein the article comprises a substrate and the housing is attached to a substrate support which supports the substrate when the pin is in a retracted position, the actuator being remote from the substrate support.

23. The assembly of claim 20, wherein the article comprises a substrate and the housing is attached to a substrate support which supports the substrate when the pin is in a retracted position, the actuator being immovably fixed in position with respect to the vacuum chamber.

24. The assembly of claim 20, wherein the actuator includes means for adjusting slack and tension on each of the cables.

25. The assembly of claim 20, wherein the pin consists essentially of a dielectric ceramic material, the cable consists essentially of a dielectric polymer material and the sleeve consists essentially of a dielectric polymer material.

26. The assembly of claim 20, wherein the cable actuated assemblies are attached to a substrate support in the vacuum chamber, the substrate support including an electrode which provides an RF bias to a substrate supported on the substrate during processing of the substrate, the pin of each of the cable actuated assemblies extending through a hole in a portion of the electrode adjacent an outer periphery thereof.

27. A lift pin assembly for lifting a substrate in a vacuum chamber, the lift pin assembly comprising:

a plurality of cable actuated assemblies, each of the cable actuated assemblies including a pin, a housing, a cable, and a sleeve, the pin being engageable with the substrate so as to lift the substrate in the vacuum chamber, the pin being slidably supported within the housing, the cable being slidable within the sleeve, the cable having a first end mechanically coupled to the pin and the sleeve having a first end mechanically coupled to the housing; and an actuator engaged with each cable so as to simultaneously move the pin of each of the cable actuated assemblies and lift or lower the substrate, each of the cable actuated assemblies being attached to a substrate support within the vacuum chamber and the actuator being located outside the vacuum chamber.

28. A lift pin assembly for lifting a substrate in a vacuum chamber, the lift pin assembly comprising:

a plurality of cable actuated assemblies, each of the cable actuated assemblies including a pin, a housing, a cable, and a sleeve, the pin being engageable with the substrate so as to lift the substrate in the vacuum chamber, the pin being slidably supported within the housing, the cable being slidable within the sleeve, the cable having a first end mechanically coupled to the pin and the sleeve having a first end mechanically coupled to the housing; and an actuator engaged with each cable so as to simultaneously move the pin of each of the cable actuated assemblies and lift or lower the substrate, the vacuum chamber comprising a plasma chamber and the cable actuated assemblies being attached to a substrate support having holes extending therethrough, the pin of each of the cable actuated assemblies being located in a respective one of the holes with a clearance therebetween, the clearance being small enough to minimize arcing during processing of a substrate clamped to the substrate support, and the actuator being located outside the plasma chamber.

* * * * *